United States Patent
Capps (10) Patent No.: US 7,457,798 B2
(45) Date of Patent: Nov. 25, 2008

(54) SYSTEM AND METHOD FOR PROVIDING A UNIVERSAL AND AUTOMATIC COMMUNICATION ACCESS POINT

(75) Inventor: Stephan P. Capps, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 623 days.

(21) Appl. No.: 09/681,183

(22) Filed: Feb. 13, 2001

(65) Prior Publication Data
US 2002/0111813 A1    Aug. 15, 2002

(51) Int. Cl.
*G06F 17/30*    (2006.01)
(52) U.S. Cl. .............................. 707/3; 707/10; 715/208
(58) Field of Classification Search .............. 707/3, 707/6, 9, 1, 4, 10; 715/500.1, 513, 208; 714/1
See application file for complete search history.

(56) References Cited

U.S. PATENT DOCUMENTS

| | | | | |
|---|---|---|---|---|
| 6,038,333 A * | 3/2000 | Wang | | 382/118 |
| 6,195,651 B1 * | 2/2001 | Handel et al. | | 707/2 |
| 6,272,490 B1 * | 8/2001 | Yamakita | | 707/4 |
| 6,301,609 B1 * | 10/2001 | Aravamudan et al. | | 709/207 |
| 6,363,380 B1 * | 3/2002 | Dimitrova | | 707/6 |
| 6,421,678 B2 * | 7/2002 | Smiga et al. | | 707/102 |
| 6,463,443 B1 * | 10/2002 | Thorner et al. | | 707/104.1 |
| 6,539,421 B1 * | 3/2003 | Appelman et al. | | 709/206 |
| 6,591,263 B1 * | 7/2003 | Becker et al. | | 707/3 |
| 6,601,026 B2 * | 7/2003 | Appelt et al. | | 704/9 |
| 6,628,729 B1 * | 9/2003 | Sorensen | | 375/316 |
| 6,717,936 B1 * | 4/2004 | Srinivasan | | 370/352 |
| 6,964,022 B2 * | 11/2005 | Snowdon et al. | | 715/759 |
| 7,146,367 B2 * | 12/2006 | Shutt | | 707/9 |
| 2002/0023067 A1 * | 2/2002 | Garland et al. | | 707/1 |
| 2002/0087521 A1 * | 7/2002 | Lee | | 707/3 |

* cited by examiner

*Primary Examiner*—Jean M Corrielus
(74) *Attorney, Agent, or Firm*—Lyon & Harr, LLP; Mark A. Watson (57) ABSTRACT

The present invention involves a new system and process for automatically scanning or parsing an electronic document or information displayed on a computer display device to find any data that represents at least one person. Once data representing a person has been found, the person is automatically identified. Next, data or information relevant to that person is automatically retrieved from at least one electronic database. Finally, once the relevant data for the person has been retrieved, a user is automatically notified, via a visible or audible alert, that the person has been identified, and that information relevant to that person is available. Further, in one embodiment, one or more links to the retrieved information are automatically provided to the user along with the audible or visual alert. In addition, in a further embodiment, the present invention provides the user with at least one access point for initiating communication with the identified person.

39 Claims, 4 Drawing Sheets

SYSTEM AND METHOD FOR PROVIDING A UNIVERSAL AND AUTOMATIC COMMUNICATION ACCESS POINT

BACKGROUND OF INVENTION

1. Technical Field

The invention is related to a system and process for automatically examining electronic data to identify at least one person represented within the electronic data and for automatically retrieving and providing information relevant to each identified person.

2. Related Art

By way of background, several schemes have been implemented for automatically providing links or "access points" for initiating communications, such as, for example, automatically addressing an email message, or providing a hyperlink to one or more Internet web pages.

One current scheme for creating an access point for initiating communications with a person involves automatically converting an email address into a hyperlink for automatically addressing an email message to that person. For example, when using a conventional word processor, if a user types text in the known format of an email address, i.e., "greg@domain-xyz.com", the word processor automatically changes the appearance of the typed text by underlining the text and/or changing the color, i.e. "greg@domain-xyz.com". Further, the typed text will also be automatically associated with a hidden HTML or similar script for initiating an email message addressed to that person. For example, an HTML script linked to the example text above might be as follows: "<mailto:greg@domain-xyz.com>". User selection of the example text will automatically open an email program or client and create a new email message addressed to greg@domain-xyz.com. However, such schemes are typically limited to changing the appearance of text and adding hyperlinks to either an email address or an address for an Internet web page. Consequently, such schemes are not capable of recognizing names or other indicia of a person, such as, for example, a phone number, a social security number, a photograph or other graphical representation, or any other data that can be used for representing a person, then retrieving information or communications links related to that person and providing that information to a user.

Another current scheme for initiating an access point for contacting a person involves user selection of individual words, phrases, or names on a display screen. A context sensitive menu is then automatically provided to the user for the selected word, phrase, or name. However, the context sensitive menu is based on a predefined list of words, phrases, and names. For example, using this scheme, if a user selects "Mark McGwire," a short biography of the baseball player Mark McGwire will automatically be called up via the Internet using a web browser. This biography may also include hyperlinks, such as, for example, an email address or other Internet web page addresses for Mark McGwire. For words, phrases, or names not in the predefined list, when the user manually selects the word, phrase, or name, this scheme either brings up a dictionary definition for the word, phrase, or name, and/or provides links to databases for providing topic specific information such as, for example a thesaurus, dictionary, or encyclopedia. However, this scheme requires that a user manually select a word, phrase, or name of interest before an associated application either provides links to related data or information, or attempts to download information relevant to the selected word, phrase, or name.

A related scheme also requires that a user select individual words, phrases, or names before links to related information are provided to the user. Further, this related scheme will automatically underline predefined keywords, and provide automatic hyperlinks to pre-selected Internet web sites related to those predefined keywords. However, this scheme is not capable of automatically recognizing names or other indicia of a person that are not in the predefined list, and then automatically retrieving information associated with the person and providing that information to a user. Further, like the previously discussed scheme, this scheme again requires that a user manually select a word or phrase of interest before an associated application either provides links to related data or information, or attempts to download information relevant to the selected word or phrase.

Therefore, what is needed is a system and method for automatically recognizing names or other indicia of a person that are not in a predefined list. Such a system and process should not require a user to manually select a word, phrase, or name of interest. Further, such a system and method should automatically retrieve information related to the recognized person. In addition, such a system and process should automatically provide the information and/or communication access points or links for the recognized person.

SUMMARY OF INVENTION

The present invention involves a new system and process for automatically identifying at least one person and providing information relative to each identified person. The present invention solves the aforementioned problems, as well as other problems that will become apparent from an understanding of the following description by automatically parsing an electronic document to identify any person represented by the electronic document, retrieving data relevant to that person from at least one electronic database, and notifying a user that the person has been identified and that relevant data is available. It should be noted that in the context of this invention, a "person" refers to an individual, a group, an organization such as a business or an agency, or any other identifiable entity.

In general, a system and process according to the present invention automatically scans or parses at least one electronic document to find any data that represents at least one person. Once data representing any person has been found, that person is automatically identified by comparing that data to information in at least one electronic database. Next, data or information relevant to that person is automatically retrieved from at least one electronic database. Finally, once the relevant data for the person has been retrieved, the user is automatically notified, via a visible or audible alert, that the person has been identified, and that information relevant to that person is available. Further, in one embodiment, one or more links to the retrieved information are automatically provided to the user along with the audible or visual alert. In addition, in one embodiment, the invention provides the user with at least one access point for initiating communication with the identified person.

Scanning an electronic document, in accordance with the present invention, comprises using conventional techniques to parse a document to identify any information that may represent a person. Preferably the electronic document is anything that is rendered on the user's computer screen or display device, such as, for example, a word processor document, an Internet Web page, a spreadsheet, or any other textual or graphical data that is rendered on the display device. However, in one embodiment, the electronic document is any type of electronic file that is stored in a computer readable storage medium. In either case, data that may represent the person includes, for example, a name, an email address, a phone number, a social security number, a photograph or other graphical representation, or any other data that can be used for representing a person.

For example, when parsing an electronic document, a scanner or parser looks for text representing data, such as, for example, a name, email address, or phone number. As each of these items is typically associated with a person, the person is capable of being identified based on that association. Alternately, the scanner/parser looks for an image embedded within an electronic document, then performs conventional recognition techniques on the image to identify the person or persons represented by the image. One example of this embodiment is to use conventional facial recognition algorithms on a photograph to identify the person or persons represented by the photograph. Clearly, any type of data representing a person may be parsed and subjected to conventional identification routines or algorithms to identify one or more persons.

Once data representing a person has been found, the person is automatically identified. Methods of identification are dependent upon the type of data found. For example, where the data associated with a person is represented by information such as specific names, email addresses or phone numbers, numerous conventional techniques exist for determining what person is associated with that information. One example of determining what person is associated with an email address is to scan one or more electronic databases having email address information, such as, for example, an end-user's electronic address book, or a local or remote email server. As another example, where a telephone number is identified, many techniques exist for performing a reverse lookup from a database of telephone listings to determine what person is associated with that telephone number. Further, as discussed above, where the data representing a person is an image, conventional image recognition techniques are used to identify the person or persons represented by the image. Clearly, any type of data, i.e. names, addresses, numbers, images, etc., associated with a person can be used to identify an associated person.

Next, data or information relevant to that person is automatically retrieved from at least one electronic database. These electronic databases may reside on the user's computer, or may reside on one or more remote servers accessible to the user's computer via a network, the Internet, or any other electronic communication means, such as, for example a direct dial service or a wireless communications service. Such relevant data includes, for example, the person's phone number, fax number, email address, home or business address, birthday, or any other available information relevant to the identified person.

Finally, once the relevant data for the person has been retrieved, the user is automatically notified that the person has been identified, and that information relevant to that person is available. The alert may be audible, such as, for example, by sounding an alarm, either once, or at a predetermined interval. In addition, the alert may be visual.

One example of a visual alert includes dynamically changing the appearance of the data representing the person identified in the electronic document. For example, the appearance of the identified data may be modified by changing the color of the information, underlining the information, causing the information to blink, changing the size or type of the font representing the information, or any other method, or combination of methods, to change the visual appearance of the information.

Alternately, the user is visually alerted or notified by dynamically modifying the parsed electronic document to add a "presence indicator," or a "presence pawn," i.e., one or more icons or other graphical indications, to the parsed document for alerting the user that one or more persons have been identified and that data relevant to at least one of the persons is available. Other methods of dynamically altering the parsed electronic document, with respect to the presence pawn, include, for example, changing the cursor, the display, or playing a sound effect when the cursor hovers over the representation of a person (i.e. the presence pawn), displaying a popup menu when the cursor hovers over the presence pawn, augmenting a context sensitive menu for the presence pawn with additional information and commands relevant to the data retrieved from the electronic database or databases with respect to the identified person, or otherwise highlighting the fact that the presence pawn is capable of user interaction. Clearly, any combination of the aforementioned audible and visual alerts may be combined for notifying the user that the person has been identified, and that information relevant to that person is available.

As discussed above, in one embodiment, one or more links to the retrieved information are automatically provided to the user along with the audible and/or visual alert. Examples of such links include providing a pop-up menu or hyperlink, or a pop-up menu in combination with one or more hyperlinks, in association with each identified person. For example, where the appearance of identified data is changed in the parsed document as discussed above, the changed data can also act as a hyperlink, or automatically open a window or popup for showing either the data relevant to the identified person, or links to that data when the identified data is selected by the user via a conventional computer pointing device, such as a keyboard or mouse. Similarly, the presence indicator added to the parsed document can also act as a link or hyperlink for viewing or accessing the data relevant to the identified person, or as an "access point" that provides the user with the capability for monitoring and initiating communication with the identified person.

Further, in one embodiment, each element of the data relevant to the identified person, i.e., the person's phone number, fax number, email address, home or business address, birthday, etc, may also be associated with a hyperlink or action button for acting on that data. In other words, these hyperlinks or action buttons are tailored to perform specific actions relative to the specific type of data represented. For example, if the data represents a physical address, the action button may automatically provide directions to the location represented by the address. In another example, if the data represents a telephone number, the action button may automatically dial the telephone number. Similarly, if the data represents an email address, the action button may automatically address an email message to that address, or provide other statistics representing that address. Further, where the displayed information represents personal information, such as a birthday, the action button may automatically link to a calendar or schedule program for scheduling events associated with that birthday. Clearly, any action appropriate to the data can be associated with an action button tied to that data.

A working example according to the present invention is embodied in a system and process that automatically interfaces with display rendering routines of a computer system. The display screen of a computer is rendered in response to instructions, i.e., the display input, such as, for example compiled software code, such as a typical computer program, or, interpreted page descriptions such an HTML or similar script. Consequently, this working example essentially scans or parses all information viewable by the user, as well as hidden text or instructions, such as, for example, hidden text embedded in the HTML code of an Internet web page, to find persons. Specifically, the working example is capable scanning the display input looking for known names, email addresses (using the canonical form of XXX@YYY.ZZZ), phone numbers, etc., or any data that may represent a person, as described above.

If a person is found, the system and process of the working example automatically determines whether the person has a corresponding messaging account (e.g. Microsoft Passport™), by automatically querying a messaging account server. If a messaging account is found for the person, data or information relevant to that person is automatically retrieved from the messaging account server. In addition, if the data or information retrieved from the messaging account server indicates that the person has a corresponding communications account or access point, the working example alters the representation of data displayed with a presence indicator, i.e., an icon or other graphical representation, or some other visual indication, as described above. The presence indicator provides the user with at least one access point for monitoring and initiating communication with the identified person via any conventional communications account or access point. Such communications accounts or access points include, for example, an email address, an instant messaging account, a telephone number, a fax number, a physical address, or any other means or method of communication with, or access to, the person that provides the user an access point for monitoring and/or initiating communication with that person.

In addition, in a further embodiment, the information or data represented by the communications accounts or access points is automatically updated by again querying the messaging account server. Consequently, if information in the messaging account relative to the person changes, the information associated with the presence indicator will also change. For example, with typical instant messaging programs, an indication of whether the person is currently online is provided to a user who has included that person in a "buddy list." Thus, where the person either goes offline, or comes online, this information will be reflected in the status of the data accessible via the data associated with the presence indicator. Further, in one embodiment, the color, shape, style, size, or other parameters defining the presence indicator also automatically change depending upon the person is online or offline.

In addition to the just described benefits, other advantages of the present invention will become apparent from the detailed description which follows hereinafter when taken in conjunction with the accompanying drawing figures.

BRIEF DESCRIPTION OF DRAWINGS

The specific features, aspects, and advantages of the present invention will become better understood with regard to the following description, appended claims, and accompanying drawings where:

DETAILED DESCRIPTION

In the following description of the preferred embodiments of the present invention, reference is made to the accompanying drawings, which form a part hereof, and in which is shown by way of illustration specific embodiments in which the invention may be practiced. It is understood that other embodiments may be utilized and structural changes may be made without departing from the scope of the present invention.

Figure 1:
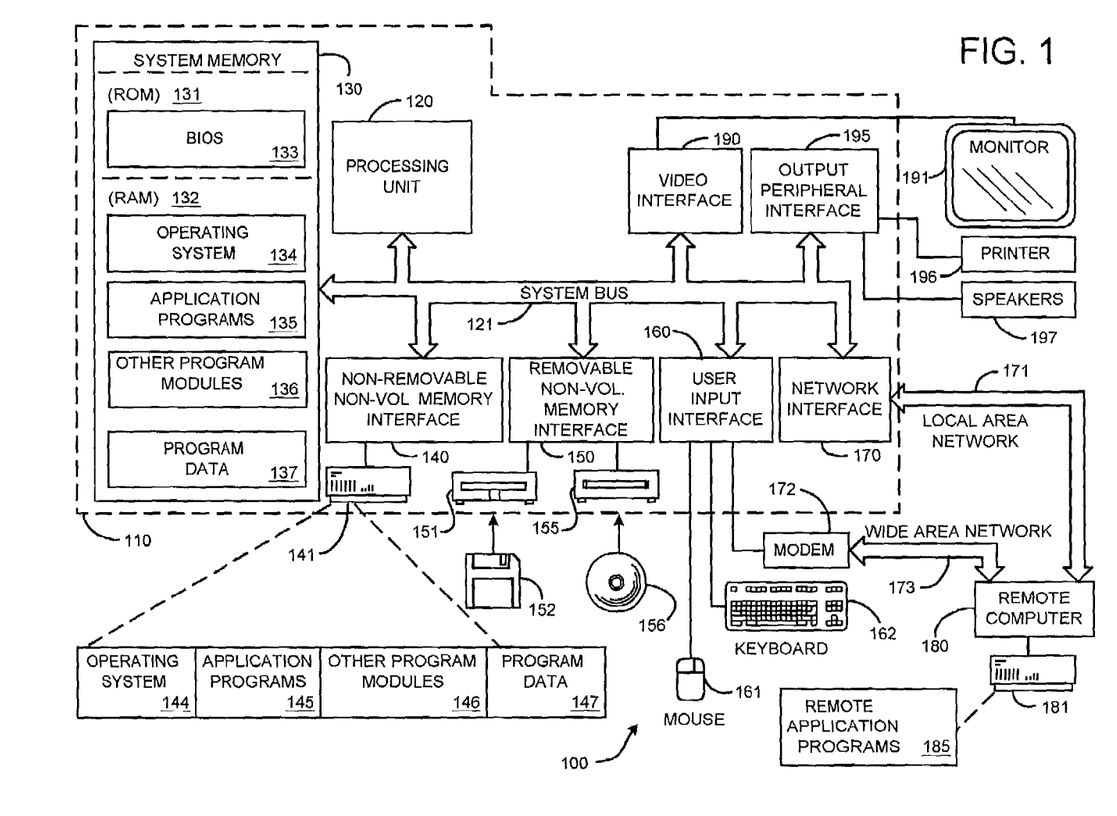
FIG. 1 is a diagram depicting a general-purpose computing device constituting an exemplary system for implementing the present invention.

Exemplary Operating Environment:

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held, laptop or mobile devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. With reference to FIG. 1, an exemplary system for implementing the invention includes a general purpose computing device in the form of a computer 110.

Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description will be devoted to a discussion of the program modules and processes embodying the present invention. The program modules associated with dynamically displaying time dependent information or data objects using a linear time strip will be described first in reference to the system diagram of FIG. 2. In addition, the processes for dynamically displaying time dependent data objects using the time strip will be described with reference to the flow diagram of FIG. 3, and the exemplary user interface of FIG. 4. Finally, an exemplary working example will be discussed.

System Overview:

A system and method according to the present invention automatically scans or parses an electronic document to identify any person, retrieves data relevant to that person, and notifies a user that the person has been identified and that relevant data is available. It should be noted that in the context of this invention, a "person" refers to an individual, a group, an organization such as a business or an agency, or any other identifiable entity.

Figure 2:
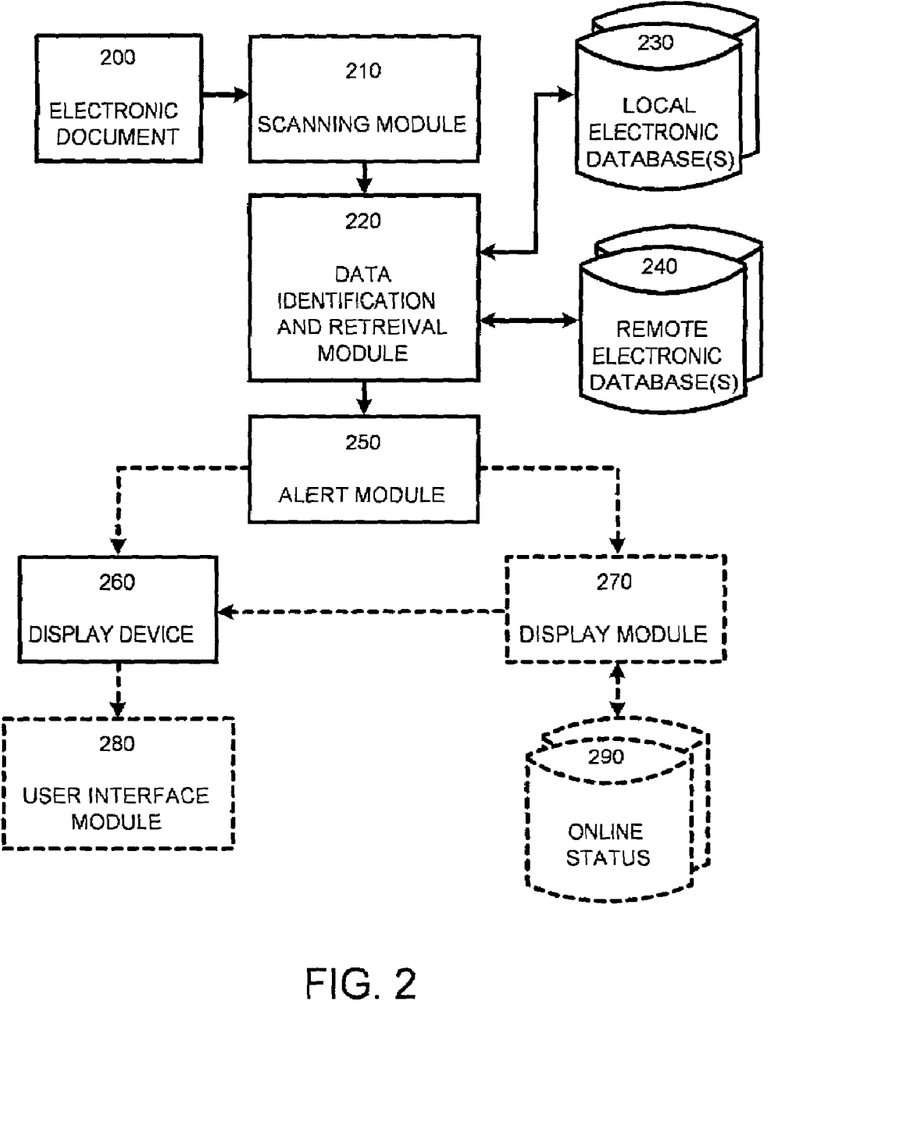
FIG. 2 is a system diagram that depicts exemplary program modules employed in a system for implementing the present invention.

FIG. 2 is a general system diagram illustrating program modules used for automatically scanning or parsing an electronic document to identify any person, retrieving data relevant to that person, and notifying a user that the person has been identified and that relevant data is available. It should be noted that the boxes and interconnections between boxes that are represented by broken or dashed lines in FIG. 2 represent alternate embodiments of the present invention, and that any or all of these alternate embodiments, as described below, may be used in combination.

In general, a system and process according to the present invention uses the program modules illustrated in FIG. 2 to automatically scan or parse at least one electronic document 200 to find any data that represents at least one person using a scanning module 210. Once data representing a person has been found, an identification and data retrieval module 220 automatically identifies the person represented by the data by comparing that data to information contained in at least one local 230 or remote 240 electronic database. The identification and data retrieval module 220 then automatically retrieves data or information relevant to the identified person from at least one of the local or remote electronic databases. It should be noted that the at least one local 230 or remote 240 electronic database may reside on a user's computer, or may reside on one or more remote servers accessible to the user's computer via a network, the Internet, or any other electronic communication means, such as, for example a direct dial service, or a wireless communications service. Further, it should be noted that the identified information does not necessarily reside within the same electronic database or databases as the relevant information which is automatically retrieved for each identified person.

Finally, once the relevant data for the person has been retrieved, an alert module 250 automatically notifies the user, via a visible or audible alert, that the person has been identified, and that information relevant to that person is available. Further, in one embodiment, using a conventional display device 260, one or more textual or graphical links to the retrieved information are automatically provided to the user along with the audible or visual alert. In addition, in one embodiment, a display module 270 automatically provides the user with at least one textual or graphical "access point," i.e. a link to at least one communications account, on the display device 260 for initiating communication with the identified person via a user interface 280.

The at least one access points include communications accounts, such as, for example, an email address, an instant messaging account, a telephone number, a fax number, a physical address, or any other means or method of communication with, or access to, the person that provides the user an access point for monitoring and/or initiating communication with that person, as described in further detail below.

In a further embodiment, the graphical appearance of each access point, or text associated with each access point further indicates whether the identified person is online or offline, i.e., whether the identified person is currently logged on to a network or the Internet, and can thus be reached via an of the access point. Specifically, in this embodiment, the display module 270 automatically queries an online status database 290, such as, for example, a messaging account server such as Microsoft Passport™, as described in further detail below, to determine whether the identified person is online. As described in further detail below, the display module 270 then automatically updates the appearance of each access point, as appropriate, to reflect the online status of the identified person.

Operation:

The above-described program modules are employed to automatically scan or parse an electronic document to identify any person, retrieve data relevant to that person, and notify a user that the person has been identified and that relevant data is available using the exemplary process that will now be described. This process is depicted in the flow diagram of FIG. 3. It should be noted that the boxes and interconnections between boxes that are represented by broken or dashed lines in FIG. 3 represent alternate embodiments of the present invention, and that any or all of these alternate embodiments, as described below, may be used in combination.

Figure 3:
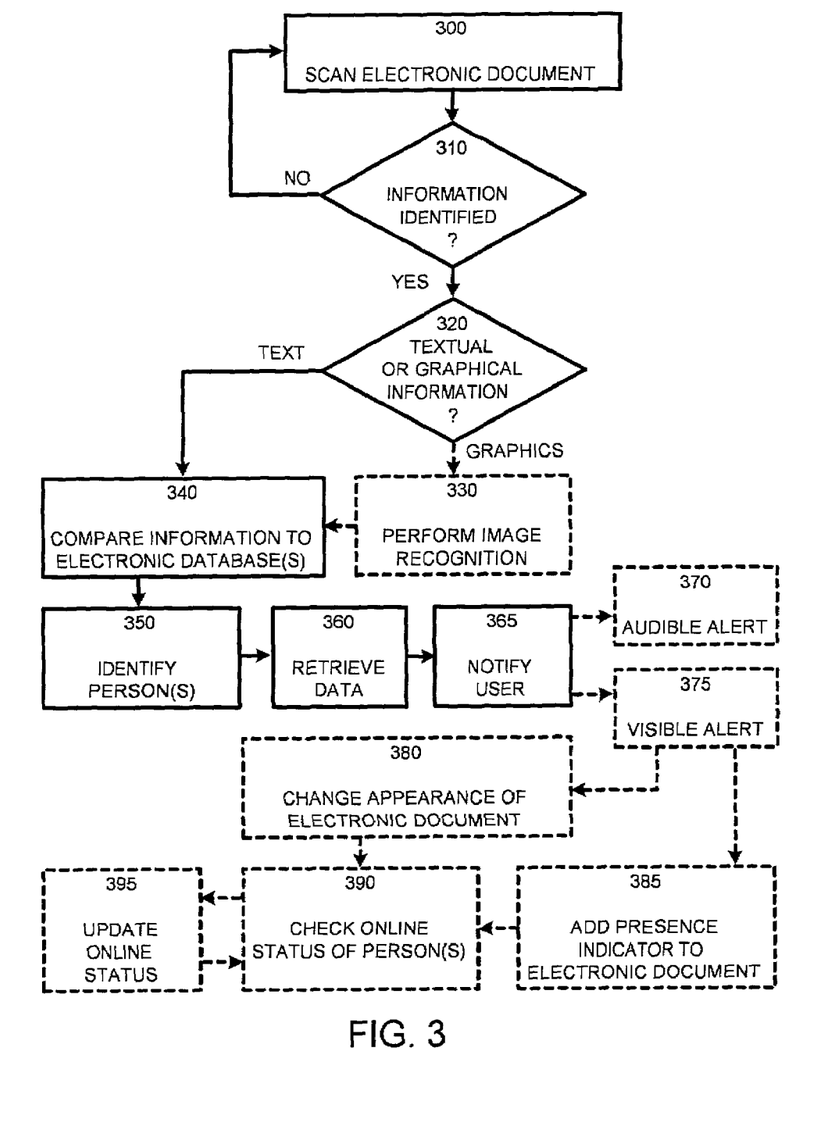
FIG. 3 is an exemplary flow diagram for implementing the present invention.

Referring now to FIG. 3 in combination with FIG. 2, the process is started by scanning an electronic document (Box 300). In accordance with the present invention, scanning an electronic document (Box 300) comprises using conventional techniques to scan or parse a document to identify any information (Box 310) that may represent a person. Preferably the electronic document is anything that is rendered on the user's computer screen or display device, such as, for example, a word processor document, an Internet Web page, a spreadsheet, or any other textual or graphical data that is rendered on the display device. However, in one embodiment, the electronic document is any type of electronic file that is stored in or on a computer readable storage medium. In either case, data that may represent the person includes, for example, a name, an email address, a phone number, a social security number, a photograph or other graphical representation, or any other data that can be used for representing a person.

For example, when scanning or parsing an electronic document (Box 300), the scanning module (210 of FIG. 2) looks for text (Box 320) representing data, such as, for example, a name, email address, or phone number. As each of these items is typically associated with a person, the person is capable of being identified based on that association. Alternately, the scanning module (210 of FIG. 2) looks for an image (Box 320) embedded within an electronic document, then performs conventional image recognition techniques (Box 330) on the image to identify the characteristics of a person or persons represented by the image. One example of this embodiment is to use conventional facial recognition algorithms on a photograph to identify the characteristics of the person or persons represented by the photograph. Clearly, any type of data representing a person may be parsed and subjected to conventional identification routines or algorithms to identify one or more persons.

Once textual or graphical data representing a person has been found, that data is automatically compared to information contained in at least one electronic database (340) for automatically identifying the person (Box 350). Methods of identification are dependant upon the type of data found. For example, where the data associated with a person is represented by information such as specific names, email addresses or phone numbers, numerous conventional techniques exist for determining what person is associated with that information. One example of determining what person is associated with an email address is to simply scan at least one electronic databases having email address information, such as, for example, an end-user's electronic address book, a local or remote email server, or other local or remote electronic databases. As another example, where a telephone number is identified in the electronic document (Box 310), many techniques exist for performing a reverse lookup from a database of telephone listings to determine what person is associated with that telephone number. Further, as discussed above, where the data representing a person is an image, conventional image recognition techniques (Box 330) are used to identify the characteristics of the person or persons represented by the image. These characteristics are then compared to information in at least on electronic database (Box 340) using conventional techniques. Clearly, any type of data, i.e. names, addresses, numbers, images, etc., associated with a person can be used to identify an associated person (Box 350).

Next, once a person has been identified (Box 350), data or information relevant to that person is automatically retrieved (Box 360) from at least one electronic database. These electronic databases may reside on the user's computer, or may reside on one or more remote servers accessible to the user's computer via a network, the Internet, or any other electronic communication means, such as, for example a direct dial service, or a wireless communications service. Such relevant data includes, for example, the person's phone number, fax number, email address, home or business address, birthday, or any other available information relevant to the identified person.

Finally, once the relevant data for the person has been retrieved (Box 360), the user is automatically alerted or notified (Box 365) that the person has been identified, and that information relevant to that person is available. The alert may be audible (Box 370), such as, for example, by sounding an alarm, either once, or at any desired interval. In addition, the alert may be visual (Box 375) as described in further detail below. Further, the alert may be both audible and visible (Box 370 and Box 375).

In an alternate embodiment, the user is visually alerted or notified (Box 375) by dynamically changing the appearance (Box 380) of the scanned electronic document (Box 300). Specifically, the data representing the person identified in the electronic document (Box 300) is dynamically modified. In this embodiment, the appearance of the identified data or information on the display device is modified using one or more techniques, such as, for example, by changing the color of the information, underlining the information, causing the information to blink, changing the size or type of the font representing the information, or any other method, or combination of methods, to change the visual appearance of the information.

In a further embodiment, the user is visually alerted or notified (Box 375) by dynamically modifying the scanned or parsed electronic document to add a "presence indicator," or a "presence pawn" (Box 385), i.e., one or more icons or other graphical indications, to the scanned electronic document (Box 300) for alerting the user that one or more persons have been identified and that data relevant to at least one of the persons is available. Preferably, at least one presence pawn is dynamically inserted into the scanned electronic document in a location adjacent to each item of identified textual or graphical data representing each person.

In still another embodiment, the online status of each identified person is automatically determined (Box 390) as described below. For example, checking the online status of the identified person includes determining whether the identified person is currently logged on to a network or the Internet, and can thus be reached by at least one access point associated with the identified person. The appearance of the text or graphics, including any presence indicators, associated with each identified person is then automatically updated (Box 395) on the computer display device to reflect the online status, as described in further detail below. Further, in a related embodiment, the online status of each identified person is automatically rechecked (Box 390) at any desired interval or period of time. Again, once the online status is rechecked, the appearance of the text or graphics, including any presence indicators, associated with each identified person is then automatically updated (Box 395), as described in further detail below with respect to an exemplary working example.

Figure 4:
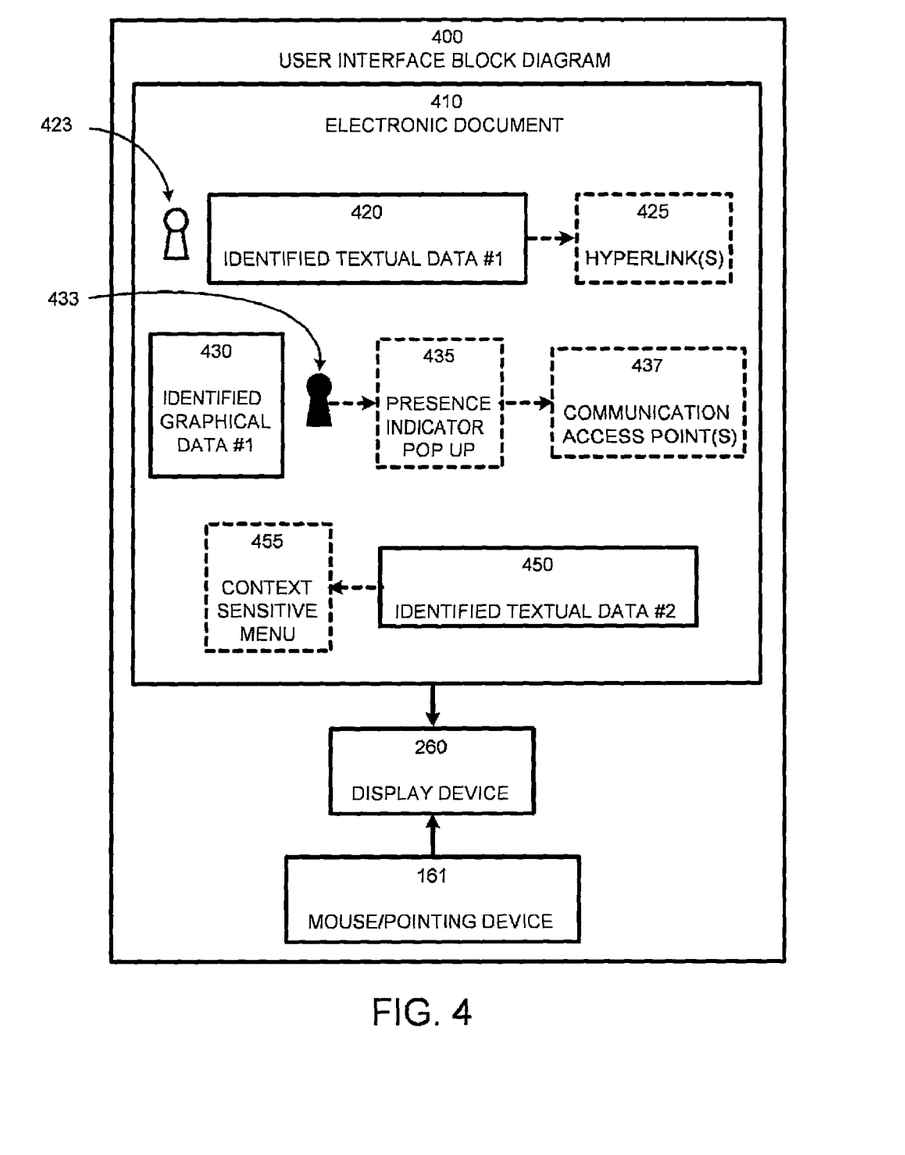
FIG. 4 is an exemplary block diagram of a user interface for interacting with a dynamically modified electronic document in accordance with the present invention.

Exemplary User Interface:

The block diagram of FIG. 4 illustrates an exemplary user interface for implementing the user interface module 280 of FIG. 2 in accordance with the system and method of the present invention. Specifically, with reference to FIG. 4, the user interface 400 allows for user interaction with the retrieved data, links, hyperlinks, access points or presence indicators dynamically added to the to the scanned electronic document 200 in accordance with the present invention.

As illustrated by FIG. 4, the user interface 400 is implemented on a computer display device 260 using conventional techniques. The user interface 400 includes the displayed electronic document 410 that has been scanned or parsed as described above to identify any textual or graphical data 420, 430 and 450, within the electronic document that represents at least one person. Further, also as described above, the electronic document 410 is dynamically modified in one of several ways in accordance with the aforementioned alternate embodiments. Specifically, the electronic document 410 is dynamically modified to indicate that data has been retrieved and is available for each identified person.

In particular, with respect to the identified textual data 420, in one embodiment, the appearance of the data is modified to indicate that the data can act as a links to retrieved information, such as, for example, a hyperlink to initiate an email message to the identified person or links to at least one Internet web page related to the identified person. Further, also with respect to the identified textual data 420, in one embodiment, a textual or graphical presence indicator 423 is dynamically added to the electronic document in association with identified textual data 420. As described above, the presence indicator is used to indicate the online status of the identified person associated with the identified textual data 420. Preferably, where an identified person either goes offline, or comes online, this information will be reflected in the status of the retrieved data accessible via the links or communication access points associated with each presence indicator. For example, a solid presence indicator 433 can be used to indicate that the identified person is online, while an outlined on non-solid presence indicator 423 can be used to indicate that the identified person is not online. Further, in one embodiment, the color, shape, style, size, or other parameters defining the graphical appearance of each presence indicator automatically changes depending upon whether the identified person associated with each presence indicator is online or offline. Additional features of the presence indicator 423 or presence pawn, along with a discussion of user interaction with the presence indicator are provided below.

Further, with respect to the identified graphical data 430, in one embodiment, a presence indicator 433 is associated with a pop-up menu that provides at least one communication access point for initiating communications with the identified person or accessing or interacting with the retrieved data relative to the identified person. In addition, with respect to the identified textual data 450, in one embodiment, a context sensitive menu for interacting with the retrieved data for the identified person associated with the identified textual data is provided.

User interaction with the electronic document 410, with respect to the presence indicator or presence pawn 423 or 433, includes, for example, changing the cursor, the display, or playing a sound effect when the cursor hovers over the representation of a person (i.e. the presence pawn), displaying a popup menu 435 when the cursor hovers over the presence pawn, augmenting a context sensitive menu 455 for the presence pawn with additional information and commands relevant to the data retrieved from the electronic database or databases with respect to the identified person, or otherwise highlighting the fact that the presence pawn is capable of user interaction. Clearly, any combination of the aforementioned audible and visual alerts may be combined for notifying the user that the person has been identified, and that information relevant to that person is available.

Further, as discussed above, in one embodiment, one or more links or hyperlinks 425 to the retrieved information are automatically provided to the user along with the audible and/or visual alert. Examples of such links include providing a pop-up menu or hyperlink, or a pop-up menu in combination with at least one communication access points 437, in association with each identified person. For example, where the appearance of identified data 420, 430, or 450 is changed in the electronic document 410 as discussed above, the changed data can also act as a hyperlink 425, or automatically open a window or popup 435, 455, for showing either the data relevant to the identified person, or links to that data when the identified data is selected by the user via a conventional computer pointing device, such as a keyboard or mouse 161. Similarly, in one embodiment the presence indicator, 423 or 433, added to the electronic document 410 also acts as a link or hyperlink for viewing or accessing the data relevant to the identified person, or as an access point that provides the user with the capability for monitoring and initiating communication with the identified person.

Additionally, in one embodiment, each element of the data relevant to the identified person, i.e., the person's phone number, fax number, email address, home or business address, birthday, etc, may also be associated with a hyperlink 425 or action button for acting on that data. In other words, these hyperlinks 425 or action buttons are tailored to perform specific actions relative to the specific type of data represented. For example, where the retrieved data represents a physical address, the action button may automatically provide directions to the location represented by the address. In another example, where the retrieved data represents a telephone number, the action button may automatically dial the telephone number. Similarly, where the retrieved data represents an email address, the action button may automatically address an email message to that address, or provide other statistics representing that address. Further, where the displayed information represents personal information, such as a birthday, the action button may automatically link to a calendar or schedule program for scheduling events associated with that birthday. Clearly, any action appropriate to the data can be associated with an action button tied to that data.

Working Example:

A working example of the present invention is embodied in an exemplary system and method for scanning or parsing an electronic document to identify any person, retrieving data relevant to that person, and notifying a user that the person has been identified and that relevant data is available. This working example automatically interfaces with display rendering routines of a computer system. The display screen of a computer is rendered in response to instructions, i.e., the display input, such as, for example compiled software code, such as a typical computer program, or, interpreted page descriptions such an HTML or similar script. Consequently, this working example essentially parses all information viewable by the user, as well as hidden text or instructions, such as, for example, hidden text embedded in the HTML code of an Internet web page, to find persons. Specifically, the working example is capable of scanning the display input looking for known names, email addresses (using the canonical form of XXX@YYY.ZZZ), phone numbers, etc., or any data that may represent a person, as described above.

If a person is found, the system and process of the working example automatically determines whether the person has a corresponding messaging account (e.g. Microsoft Passport™), by automatically querying a messaging account server. If a messaging account is found for the person, data or information relevant to that person is automatically retrieved from the messaging account server. In addition, if the data or information retrieved from the messaging account server indicates that the person has a corresponding communications account or access point, the working example alters the representation of data displayed with a presence indicator, i.e., an icon or other graphical representation, or some other visual indication, as described above. The presence indicator provides the user an access point for monitoring and initiating communication with the identified person via any conventional communications account or access point. Such communications accounts or access points include, for example, an email address, an instant messaging account, a telephone number, a fax number, a physical address, or any other means or method of communication with, or access to, the person that provides the user an access point for monitoring and/or initiating communication with that person.

In addition, in a further embodiment, the information or data represented by the communications accounts or access points is automatically updated. Consequently, if information in the messaging account relative to the person changes, the information associated with the presence indicator will also change. For example, with typical instant messaging programs, an indication of whether the person is currently online is provided to a user who has included that person in a "buddy list." Consequently, where the person either goes offline, or comes online, this information will be reflected in the status of the data accessible via the data associated with the presence indicator. Further, in one embodiment, the color, shape, style, size, or other parameters defining the presence indicator also automatically change depending upon the person is online or offline.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A system for automatically alerting a user to available information comprising a computing device having a memory and a processor for:

automatically interpreting and parsing information recovered from an electronic document being displayed on a display device coupled to the computing device to identify data representing an entity;

automatically identifying at least one entity represented by the identified data, by comparing the identified data to information contained in at least one local or remote electronic database to identify each entity associated with the identified data;

automatically retrieving information relating to each identified entity from at least one electronic database;

automatically notifying the user that the retrieved information is available via a visual or audible alert;

automatically modifying an appearance of the electronic document being rendered on the computer display device by editing the electronic document to insert at least one graphical presence indicator into the electronic document in a location adjacent to the data representing each identified entity; and using at least a portion of the retrieved information relating to one or more of the identified entity to automatically provide the user with at least one textual or graphical links to at least one communications account for initiating communication with each identified entity via a user interface.

2. The system of claim 1 wherein the at least one presence indicator is an icon representing at least one communication access point related to the retrieved information.

3. The system of claim 1 wherein the at least one electronic interface for initiating communication with one or more of the identified entity includes any of an email address, an instant messaging account, a telephone number, a fax number, and an Internet address for communicating with the identified entity.

4. The system of claim 1 wherein parsing the recovered electronic information to identify data representing the entity comprises identifying textual data associated with the entity.

5. The system of claim 4 wherein the textual data associated with the entity includes any of: a name, an email address, a telephone number, a fax number, and a social security number.

6. The system of claim 1 wherein parsing the recovered electronic information to identify data representing the entity comprises identifying graphical data associated with any entity.

7. The system of claim 6 wherein the graphical data associated with the entity includes any image for representing at least one entity.

8. The system of claim 1 wherein dynamically modifying the appearance of the electronic document comprises changing the appearance of the identified data.

9. The system of claim 8 wherein dynamically modifying the appearance of the electronic information being displayed on the display device further comprises automatically associating at least one hyperlink with the identified data.

10. The system of claim 1 further comprising automatically determining an online status for each identified entity by querying at least one messaging account server for each identified entity.

11. The system of claim 10 wherein each presence indicator graphically represents the online status of each identified entity.

12. The system of claim 11 wherein the graphical representation of the online status of each identified entity is automatically updated by re-querying the at least one messaging account server for each identified entity.

13. The system of claim 1 further comprising a graphical user interface for interacting with the retrieved information.

14. The system of claim 13 wherein the graphical user interface comprises at least one pop-up window for displaying the retrieved information for each identified entity.

15. The system of claim 13 wherein the graphical user interface comprises at least one context-sensitive menu for interacting with the retrieved information for each identified entity.

16. The system of claim 13 wherein the graphical user interface comprises at least one hyperlink for accessing the retrieved information for each identified entity via a computer pointing device.

17. A computer-implemented process for automatically providing information on a computer display device, comprising:

automatically interpreting and scanning electronic data retrieved from an electronic document being rendered on the computer display device to identify information within the retrieved electronic data that represents at least one entity;

automatically identifying at least one entity represented by the identified data, by comparing the data to information contained in at least one local or remote electronic database;

automatically retrieving information relating to each identified entity from at least one electronic database;

automatically notifying the user that the retrieved information is available via a visual or audible alert;

automatically providing to the user along with the audible or visual alert one or more textual or graphical links to the retrieved information;

automatically modifying an appearance of the electronic document being rendered on the computer display device by editing the electronic document to insert at least one graphical presence indicator into the electronic document in a location adjacent to the data representing each identified entity; and using at least a portion of the retrieved information relating to one or more of the identified entity to automatically provide a user interface for initiating communication with the identified entity via at least one electronic communication access point.

18. The computer-implemented process of claim 17 wherein the user interface provides a user access for viewing the retrieved information.

19. The computer-implemented process of claim 17 wherein dynamically modifying the electronic data rendered on the computer display device comprises automatically changing the appearance of textual information representing the identified information.

20. The computer-implemented process of claim 19 wherein dynamically modifying the electronic data rendered on the computer display device further comprises automatically associating at least one hyperlink with the textual information.

21. The computer-implemented process of claim 17 wherein dynamically modifying the electronic data rendered on the computer display device comprises automatically changing the appearance of graphical information representing the identified information.

22. The computer-implemented process of claim 21 wherein dynamically modifying the electronic data rendered on the computer display device further comprises automatically associating at least one hyperlink with the graphical information.

23. The computer-implemented process of claim 17 wherein each presence indicator comprises an associated pop-up window for providing the retrieved information to a user.

24. The computer-implemented process of claim 17 wherein each presence indicator comprises an associated context-sensitive menu for providing the retrieved information to a user.

25. The computer-implemented process of claim 17 wherein each presence indicator comprises automatically indicating an online status of each identified entity.

26. The computer-implemented process of claim 17 wherein the at least one communication access point includes one or more of an email address, an instant messaging account, a telephone number, a fax number, and an Internet address.

27. A computer-readable medium having computer executable instructions for dynamically modifying an electronic document rendered on a computer display device, said computer executable instructions comprising:
    automatically evaluating electronic information of an electronic document being rendered on a display device coupled to the computing device for detecting any information in the electronic document that represents at least one entity;
    automatically identifying each entity based on a comparison of the detected information to data in at least one electronic database;
    automatically retrieving data related to each identified entity from at least one electronic database;
    dynamically modifying the rendered display of the electronic document by changing an appearance of the electronic document on the display device for alerting a user that data related to each identified entity has been retrieved by editing that document to insert at least one presence indicator into the electronic document, each said presence indicator being inserted into the electronic document in a location adjacent to the detected information representing the at least one entity; and
    using at least a portion of the retrieved information relating to one or more of the identified entity to automatically provide a user interface for initiating communication with the identified entity via at least one electronic communication access point.

28. The computer-readable medium of claim 27 wherein detecting any information in the electronic document that represents at least one entity comprises identifying any data associated with any entity.

29. The computer-readable medium of claim 28 wherein identifying any data associated with any entity comprises identifying characteristics of at least one image within the electronic document using at least one image recognition technique.

30. The computer-readable medium of claim 27 wherein retrieving data related to each identified entity from at least one electronic database comprises retrieving any of entity data and contact information from the at least one electronic database.

31. The computer-readable medium of claim 27 wherein dynamically modifying the rendered display of the electronic document further comprises changing the appearance of any text associated with the detected information.

32. The computer-readable medium of claim 31 wherein changing the appearance of any text associated with the detected information further comprises associating at least one hyperlink with the text associated with the detected information.

33. The computer-readable medium of claim 32 wherein the at least one hyperlink includes at least one link to the retrieved data.

34. The computer-readable medium of claim 33 wherein the at least one link to the retrieved data includes at least one communication access point for initiating at least one communication with each identified entity, said communication access points including via one or more of an email address, an instant messaging account, a telephone number, a fax number, and an Internet address.

35. The computer-readable medium of claim 27 wherein dynamically modifying the rendered display of the electronic document further comprises changing the appearance of any image associated with the detected information and associating at least one hyperlink with each image.

36. The computer-readable medium of claim 27 wherein each presence indicator further comprises an associated pop-up window for providing the retrieved information to a user.

37. The computer-readable medium of claim 27 wherein each presence indicator further comprises an associated context-sensitive menu for providing the retrieved information to a user.

38. The computer-readable medium of claim 27 wherein each presence indicator further comprises automatically indicating an online status of each identified entity.

39. The computer-readable medium of claim 27 further comprising a user interface for interacting with the retrieved data.

* * * * *

UNITED STATES PATENT AND TRADEMARK OFFICE
CERTIFICATE OF CORRECTION

| | | |
|---|---|---|
| PATENT NO. | : 7,457,798 B2 | |
| APPLICATION NO. | : 09/681183 | |
| DATED | : November 25, 2008 | |
| INVENTOR(S) | : Stephen P. Capps | |

It is certified that error appears in the above-identified patent and that said Letters Patent is hereby corrected as shown below:

Title Pg, Item (75), under "Inventor" delete "Stephan P. Capps," and insert -- Stephen P. Capps, --, therefor.

Signed and Sealed this
Twenty-sixth Day of April, 2011

David J. Kappos
*Director of the United States Patent and Trademark Office*